United States Patent Office 2,774,497
Patented Dec. 18, 1956

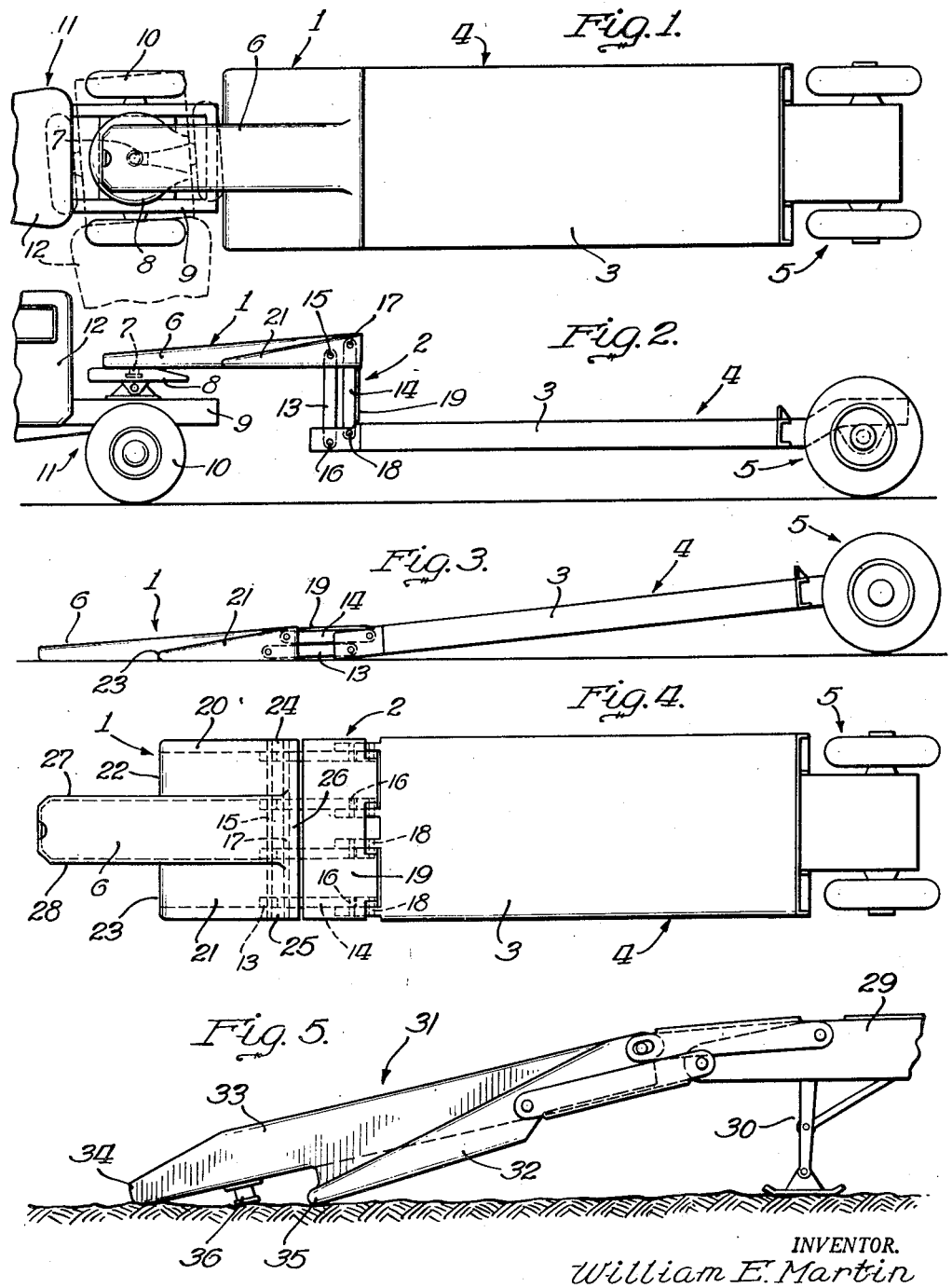

2,774,497

NOTCHED GOOSENECK TRAILER CONSTRUCTION

William E. Martin, Kewanee, Ill.

Application April 16, 1953, Serial No. 349,159

15 Claims. (Cl. 214—506)

This invention relates generally to a folding gooseneck on a trailing vehicle adapted for connection with a towing vehicle.

More specifically this invention relates to a notched gooseneck hitch structure constructed and arranged for operative connection with a fifth wheel of a tractor or towing vehicle.

One of the objects of this invention is to provide a folding gooseneck having a hitch tongue functioning in the dual capacity of the principal towing or draw bar unit and also as a loading ramp unit for a trailer when lowered into ground contacting position, and which gooseneck is structurally arranged and designed to save considerable weight and material comparable to similar structures now in use for analogous purposes.

Another object of the present invention is to provide a gooseneck having a combination hitch tongue and ramp unit which is adapted for fifth wheel towing connection and wherein the combination hitch unit has a configuration to establish certain clearance relationships in the arrangement of the several parts thereof whereby a much lighter gooseneck may be employed while maintaining ample turning clearance room for the cab of a tractor or towing vehicle for maneuvering the connected vehicles under all normal conditions of operation. With the present gooseneck configuration it is possible to use towing vehicles or tractors with much smaller clearance distances between the cab and fifth wheel location than possible under operating conditions in handling a gooseneck of full width construction throughout its length. Under some conditions of operation, the overall length of the gooseneck may also be reduced when constructed according to the principles of the present design.

Another object of this invention is to provide a trailer hitch tongue having a full width deck at its trailer bed connected end while the other free end thereof is formed into a central towing tongue with a hitch pin for fifth wheel connection, with such tongue being flanked by laterally positioned ramp sections terminating intermediate the overall length of the tongue whereby notched corners are established in the forward laterally outward corners of the combination unit.

A still further object of this invention is to provide a notched combination hitch tongue and ramp unit that is connected with the forward end of a trailer bed through a swingable link mechanism including an intermediate deck structure to bridge the gap between the connected combination unit and the joining trailer bed for use when the gooseneck is folded into trailer loading position.

Other objects and advantages relating to the combination hitch and ramp unit of the present invention shall hereinafter appear in the following detailed description having reference to the accompanying drawings forming a part of this specification.

In the drawing:

Fig. 1 is a general plan view of a trailer incorporating a folding gooseneck constructed according to the principles of the present invention and showing the trailer connected with a towing vehicle;

Fig. 2 is a side elevational view of the arrangement shown in Fig. 1;

Fig. 3 is a side elevational view of the trailer with the gooseneck lowered into trailer loading relation;

Fig. 4 is a plan view of the trailer illustrated in Fig. 3; and

Fig. 5 is a modified arrangement of the folding gooseneck construction.

As shown in the drawing, the gooseneck 1 is connected by a swingable link mechanism 2 with the forward end of the bed 3 of a trailer 4 having a suitable mobile wheel carriage 5 connected with the bed 3 at the rearward end thereof.

The gooseneck 1 comprises a hitch tongue 6 supplied with a hitch pin 7 disposed for operative hitching and latching engagement with a fifth wheel 8 carried upon the chassis 9 above the rear wheels 10 of a tractor 11 having a cab 12. The swingable link mechanism 2 includes sets of links 13 and 14 disposed fore and aft with the ends of links 13 pivoted at 15 on the tongue 6 and at 16 on bed 3. Links 14 have their ends connected to tongue 6 at 17 and to the bed 3 at 18. A suitable bridge panel 19 is connected with links 14 to provide a supporting unit for vehicles or other equipment that is directed to or away from the bed 3 across the gooseneck when in lowered or operative loading position.

The hitch tongue 6 is flanked by a contiguous ramp structure comprising the ramps 20 and 21 which each terminate in tapered or low height ends 22 and 23 at points aligned transversely of the gooseneck and also intermediate the length thereof with reference to the central hitch tongue 6. The rearward thickness of the ramp ends 24 and 25 are preferably the same as the tongue 6 at the link connected end 26 thereof. The tongue itself is preferably tapered to provide a heavier vertical cross sectional structure at its attached end than at its free hitch end thus producing a cantilever tongue arrangement to support the trailer upon the bearing plate of the fifth wheel 8 of the tractor 11.

Tongue 6, as explained, is the hitching instrumentality of the gooseneck and the tongue structure forms a vehicle approaching guide unit intermediate the two flanking ramps 20 and 21 when lowered. The longitudinal lateral sides 27 and 28 of the tongue 6 are upright to aid in guiding the wheels of a vehicle onto the trailer bed. Since the contiguous transverse portion of the gooseneck comprising the hitch tongue and ramps are all at substantially the same thickness, a vehicle may be shifted angularly within limits at the trailer zone end of the tongue and ramps to adjust the approaching or leaving position of the vehicle relatively to the center line of the bed and adjacent the link deck 19 before such vehicle passes onto the bed or away therefrom.

The gooseneck shown in Figs. 1 to 4 inclusive presents a combination hitch and ramp wherein the bottom surfaces of the ramp portions thereof coincide with the bottom portion of the hitch tongue providing a coplanar underside for the gooseneck. The upper surfaces of the ramps each define a different angular relation with respect to the upper surface of the hitch tongue. The gooseneck as illustrated in Fig. 3 is shown flat on the ground with the adjacent end of the trailer bed also resting upon the ground.

In Fig. 5 a modified gooseneck is shown for use with a trailer 29 having front and supporting feet 30 and wherein a greater loading angle is assumed by the folded gooseneck 31. This gooseneck may be constructed and arranged to operate from a blocked up front trailer end as shown in my Patent No. 2,611,496, issued September 23, 1952, or the gooseneck may be of the character or type that is mechanically raised and lowered as in my prior Patent No. 2,441,710, issued May 18, 1948. In this construction the general horizontal median plane pitch angle of the ramps 32 is shifted downwardly with respect to the general horizontal median plane of the hitch tongue 33. Here the head end 34 of the hitch tongue 33 rests on the ground ahead of the head points or ends 35 of the ramps 32 causing the top ramp surfaces or roadways of the ramps to angle toward the ground under greater angularity conditions created by a higher front and bed position.

The latter arrangement also utilizes the ramp ends or tips as supports to guard the hitch pin 36 from excessive abuse and damage. The pin may also be of a removable construction such as shown and described in my copending application, Serial No. 38,837, filed July 15, 1948, and now Patent No. 2,656,195.

The foregoing description relates more specifically to the embodiments of the invention shown as preferred constructions in the drawings. Certain changes and modifications in the elements and in the combination of such elements are contemplated without departing from the fundamental concept of this invention. However, all such modifications shall be governed by the breadth and scope of the language of the claims appended hereto.

What I claim is:

1. In a trailer, a bed, a hitch unit to connect said trailer bed with towing hitch means on a towing vehicle, said hitch unit incorporating a tongue connected with said trailer bed and extending outwardly away from said trailer bed, and loading ramps comprising side wings on said tongue disposed in spaced relation to said trailer bed, said side wings terminating intermediate the length of said tongue.

2. In a trailer, a bed, a hitch unit to connect said trailer bed with towing hitch means carried by a towing vehicle, said hitch unit incorporating a tongue connected with said trailer bed and projecting outwardly therefrom, and loading ramps comprising platform members connected with said tongue and disposed in spaced relation with respect to said trailer bed, said platform members terminating intermediate the length of the tongue, said tongue width being less than the trailer bed width, and said platform members and tongue together being substantially of trailer bed width.

3. In a trailer, a bed, a folding gooseneck to connect said trailer bed with towing hitch means on a towing vehicle, said folding gooseneck incorporating a tongue connected with said trailer bed and extending outwardly away from said trailer bed, and loading ramps comprising side wings on said tongue carried by said tongue in spaced relation to said trailer bed, said side wings terminating intermediate the length of said tongue, said tongue including a hitch member adapted for connection with said towing hitch means, and said tongue and side wings together comprising a unitary integral structure.

4. In a trailer, a hitch unit to connect said trailer with towing hitch means on a towing vehicle, said hitch unit comprising a tongue connected with said trailer and extending outwardly away from said trailer, and loading ramps comprising side wings on said tongue at the trailer end thereof and terminating intermediate the length of said tongue, said tongue including a hitch member, and said tongue and side wings comprising a unitary integral structure, and swingable mechanism to connect said tongue with the trailer constructed and arranged to swing said tongue from operative hitching position to ground engaging position.

5. In a trailer, a hitch unit to connect said trailer with towing hitch means on a towing vehicle, said hitch unit comprising a tongue connected with said trailer and extending outwardly away from said trailer in a predetermined elevation with respect thereto, and side wings on said tongue at the trailer end thereof and terminating intermediate the length of said tongue, said tongue including a hitch member, and said tongue and side wings comprising a unitary integral structure, and swingable mechanism to connect said tongue with the trailer constructed and arranged to swing said tongue from operative hitching position to ground engaging position, said side wings comprising trailer loading ramps, and said swingable mechanism including deck means to provide a bridge between the lowered hitch tongue and the trailer.

6. In a trailer, a hitch unit to connect said trailer with towing hitch means carried by a towing vehicle, said hitch means comprising a tongue connected with said trailer and projecting outwardly therefrom, and platform members connected with said tongue at the trailer end thereof and terminating intermediate the length of the tongue, said tongue width being less than the trailer width, and said platform members and tongue together being substantially of trailer width, and movable link means interposed between said hitch means and said trailer to swing said hitch means from operating towing position to ground engaging position, said platform members each having inclined upper surfaces to form loading ramps for said trailer.

7. In a trailer, a hitch unit to connect said trailer with towing hitch means carried by a towing vehicle, said hitch means comprising a tongue connected with said trailer and projecting outwardly therefrom, and platform members connected with said tongue at the trailer end thereof and terminating intermediate the length of the tongue, said tongue width being less than the trailer width, and said platform members and tongue together being substantially of trailer width, and movable link means interposed between said hitch means and said trailer to swing said hitch means from operating towing position to ground engaging position, said platform members each having inclined upper surfaces to form loading ramps for said trailer, and said link means including a roadway deck structure thereon to provide a bridge between said hitch means and said trailer.

8. In a trailer, a bed, a hitch unit, and swingable mechanism connecting said hitch unit with said bed, said hitch unit including a hitch tongue of a predetermined length, and a pair of loading ramps projecting laterally outwardly from opposite sides of said tongue with said ramps being of different lengths than said tongue.

9. In a trailer, a bed, a hitch unit, and swingable mechanism connecting said hitch unit with said bed, said hitch unit including a hitch tongue, and a pair of loading ramps suspended laterally outwardly of said tongue and abreast of the opposite sides thereof, said ramps comprising an integral portion of said tongue and extending from a point disposed toward the trailer end of the tongue to a forward point intermediate the length thereof, and said tongue having upright side portions extending over said ramps to provide a guide member between said ramps to aid in directing mobile units being loaded onto the ramps.

10. In a trailer, a bed, a hitch unit, and swingable mechanism connecting said hitch unit with said bed, said hitch unit comprising a hitch tongue, and a pair of loading ramps flanking said tongue at opposite sides thereof, said ramps comprising an integral portion of said tongue and extending from the trailer end of the tongue to a point intermediate the length thereof, and said tongue comprising a central guide member between said ramps to aid in directing mobile units being loaded onto the ramps, said ramps having tapered terminal ends disposed away from said trailer to receive said units, and said trailer ends of said ramps being of tongue thickness at said trailer whereby the trailer end of said hitch unit permits shifting of said mobile units at the trailer end and in the general plane of the attached end of said hitch means.

11. In a trailer, a bed, a hitch unit, and swingable mechanism connecting said hitch unit with said bed, said hitch unit comprising a hitch tongue, and a pair of loading ramps flanking said tongue at opposite sides thereof, said ramps each having inclined upper surfaces extending forwardly and downwardly from the upper surface portion of said hitch tongue, and the under surfaces of said hitch tongue and said ramps being constructed in coplanar relation.

12. In a trailer, a bed, a hitch unit, and swingable mechanism connecting said hitch unit with said bed, said hitch unit including a hitch tongue provided with integrally formed loading ramps projecting laterally outwardly from said tongue at opposite sides thereof, said hitch tongue and said ramps being constructed and arranged to dispose the horizontal median planes of said ramps in a different angular relation with respect to the horizontal median plane of said hitch tongue.

13. In a trailer, a trailer bed, a hitch unit, and swingable means pivotally connected with said hitch unit and said bed, said hitch unit comprising a towing tongue, and a pair of bed loading ramps connected with said tongue and extending laterally outwardly therefrom, said swingable means providing mechanism to guide said tongue from an elevated towing position into a ground engaging position with said bed occupying a given relation with respect to the ground, and said loading ramps being shorter than the length of said tongue and occupying angular tilted positions with respect to said tongue whereby the outer end portions of said ramps are also brought into engagement with said ground when said tongue is lowered to the ground through said swingable means.

14. A gooseneck towing mechanism for a trailing vehicle comprising pivotal means connected with the trailing vehicle, and a hitch tongue connected with said pivotal means and adapted for hitching connection at an elevation above the chassis of a towing vehicle and behind the cab thereof, said tongue being of narrow width with respect to the full width of the trailing vehicle, and loading ramps carried upon the side portions of said tongue but terminating in a given relation with respect to the towing vehicle chassis and cab to establish a notched front end tongue structure to provide greater turning clearances for said structure with respect to the structural parts of the towing vehicle.

15. In a gooseneck towing mechanism as set forth in claim 14, but wherein said tongue is provided with a downwardly and forwardly tapered top surface portion and wherein said ramps each include downwardly and forwardly tapered top surface portions disposed in predetermined given relations with respect to said tapered surface portion of said tongue to provide cooperative vertical clearance provisions for a vehicle being moved over said composite tongue structure.

References Cited in the file of this patent

UNITED STATES PATENTS

| | | |
|---|---|---|
| 2,449,947 | Meadows | Sept. 21, 1948 |
| 2,452,789 | Pike | Nov. 2, 1948 |
| 2,605,916 | Martin | Aug. 5, 1952 |
| 2,611,496 | Martin | Sept. 23, 1952 |